United States Patent [19]
Cole

[11] Patent Number: 5,016,664
[45] Date of Patent: May 21, 1991

[54] AUTOMATIC SWITCHING VALVE

[76] Inventor: Mark F. Cole, 3520 N. Fiesta Del Sol W., Tucson, Ariz. 85715

[21] Appl. No.: 563,520

[22] Filed: Aug. 6, 1990

[51] Int. Cl.$^5$ ............................................. F16K 11/02
[52] U.S. Cl. .................................... 137/1; 137/119
[58] Field of Search .................................. 137/119, 1

[56] References Cited

U.S. PATENT DOCUMENTS

| | | |
|---|---|---|
| 470,489 | 3/1892 | Henkel . |
| 2,893,416 | 7/1959 | Hegstad .......................... 137/119 |
| 3,425,437 | 2/1969 | Knerr et al. ...................... 137/119 |
| 3,570,539 | 3/1971 | Herring ............................ 137/625 |
| 3,667,498 | 6/1972 | Mizuno ............................ 137/119 |
| 3,841,346 | 11/1974 | Amblank ........................ 137/119 |
| 4,178,954 | 12/1979 | Klieves ............................ 137/119 |
| 4,807,665 | 2/1989 | Schiel ............................. 137/625 |

*Primary Examiner*—Alan Cohan
*Attorney, Agent, or Firm*—Antonio R. Durando; Harry M. Weiss

[57] ABSTRACT

An enclosed valve with one inlet connected by a rotating gate to two alternative outlets. The fluid pressure keeps the gate in position to seal the first outlet while the second one is open. When the pressure is sufficiently reduced, a spring releases the gate from the first outlet and swings it to a new position, whereby it leaves the first outlet open and seals the second outlet. That gate position is maintained upon repressurization until a new pressure drop is experienced. Then, the reverse takes place and the gate swings in the opposite direction to open the second outlet and again seal the first one.

14 Claims, 2 Drawing Sheets

AUTOMATIC SWITCHING VALVE

BACKGROUND OF THE INVENTION

1. Field of the Invention

This invention pertains to the general field of fluid control devices used in water irrigation and similar distribution systems. In particular, it provides a new and improved valve for automatically and alternatingly switching fluid flow between two downstream lines from a common upstream source.

2. Description of the Prior Art

The practice of diverting water flow in irrigation systems has been known since ancient times. Water available in limited amounts from a single source is alternately channelled to different areas downstream in order to provide water flow for a given length of time in a quantity sufficient to meet the specific needs of each area. As these needs are met, the flow is diverted to another area in the distribution system with comparable requirements. The principle behind this practice is the same whether a large volume aqueduct or a garden sprinkling system is involved.

In order to implement this practice, it became necessary to devise means for stopping the water flow through a given channel and diverting it to an alternative one. Thus, different devices have been invented, ranging from ancient manual ditch gates to sophisticated modern automatic valves.

For instance, U.S. Pat. No. 470,489 to Henkel (1892) describes a water cut-off device that automatically diverts the flow of water from one conduit to another after a predetermined amount of flow. The invention uses a deflector actuated by a lever mounted on a wheel that is turned by the water passing through the first conduit. Though automatic, the device has to be reset after each use. This patent is directed primarily to delivery systems for the storage of rain water.

U.S. Pat. No. 3,425,437 to Knerr (1969) shows a fluid control device for automatic laundry machines that incorporates a valve mechanism to divert flow between two conduits. The mechanism is set manually at the beginning of the cycle and is then automatically controlled by fluid pressure in cooperation with a set of springs and levers that change the position of the valve between washing stages. If not reset, the mechanism is inoperative. This apparatus is designed for use strictly in conjunction with washing machines.

In U.S. Pat. No. 3,570,539 (1971), Herring teaches a gate for stopping the flow of material from an input channel or, alternatively, for allowing flow through the gate and to one of two output channels. The gate is operated and kept in place by a lever that can be actuated either manually or automatically. The invention does not include an apparatus for switching the direction of flow at the occurrence of predetermined events.

U.S. Pat. No. 3,667,498 to Mizuno (1972) illustrates a new sprinkling-system valve that permits the sequential flow of water first to a branch line and then to a primary line for continuing distribution downstream. The valve contains a pivoted vane that is spring-biased to close the branch conduit and to open the main conduit. When the water pressure is momentarily interrupted, the vane switches to the alternate position and the next direction of flow is through the main conduit. The result is the automatic switch of flow to the next downstream station when the water is temporarily shut off from the station that is currently being irrigated. The valve must be reset between cycles to re-establish flow to the branch station.

In U.S. Pat. No. 3,841,346 (1974), Amblank describes an apparatus for diverting water flow from the bath tub faucet to the shower head and vice versa. After being switched manually from one option to the other, the device is kept in position by the pressure of the water delivery system. The invention is directed exclusively to plumbing applications.

In U.S. Pat. No. 4,178,954 (1979), Klieves shows a diaphragm valve that alternatingly switches the direction of flow between two lines every time the water pressure is interrupted. This result is obtained automatically by a cycling mechanism that is alternately cocked into a position to open the previously closed portion of the valve. This apparatus requires no resetting and is designed especially for irrigation purposes.

Finally, U.S. Pat. No. 4,807,665 to Schiel (1989) discloses an electromagnetically driven valve for selectively receiving fluid flow from two separate inlets. This valve contains no mechanism for automatically switching the path of flow and is not sensitive to fluid pressure. Although designed for general application, it could not be effectively used as a substitute for your invention.

It is evident from the foregoing that the prior art is either very complicated, inasmuch as it utilizes complex mechanical and electrical devices to switch the course of fluid flow, or not automatic, requiring periodic manual resetting. Therefore, there still exists a need for a simple device that addresses these problems.

BRIEF SUMMARY OF THE INVENTION

The present invention consists of an enclosed valve with one inlet connected by a rotating gate to two alternative outlets. The fluid pressure keeps the gate in position to seal the first outlet while the second one is open. When the pressure is sufficiently reduced, a spring releases the gate from the first outlet and swings it to a new position, whereby it leaves the first outlet open and seals the second outlet. That gate position is maintained upon repressurization until a new pressure drop is experienced. Then, the reverse takes place and the gate swings in the opposite direction to open the second outlet and again seal the first one.

One objective of this invention is the realization of a mechanism for switching fluid flow from a single source between two alternate downstream conduits. This is achieved by the action of a swinging gate that alternatingly blocks one of the conduits while leaving the input port open.

Another objective of the invention is that it be environmentally safe. Therefore, the apparatus described herein is totally encased and can be constructed of any material suitable for the specific application.

Another goal of this invention is the development of a separate mechanism that will automatically cause the rotation of the gate described above between pressure drop cycles. This is obtained through a spring whose position is cyclically set by the swinging gate to cause it to rotate in the desired direction when the fluid pressure drops.

Another objective is that the valve be totally self-contained and not require periodic resetting. Accordingly, the apparatus of this invention operates without connection to any extraneous mechanical or electrical device.

A further objective of the invention is the ability to apply the same design to various fluids, without limitations of scale and under different operating conditions. To that end, the apparatus described herein can be used universally, so long as the fluid can exert sufficient pressure on the gate to cause it to seal one of the outlet ports.

Yet another objective of this invention is the realization of the above mentioned goals in an economical and commercially viable manner. This is done by utilizing simple components that are either already available in the open market or can be produced at competitive prices.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

DETAILED DESCRIPTION OF THE INVENTION

The heart of this invention lies in the novel mechanism that provides the means by which the gate of the valve automatically switches from one outlet to the other between pressure cycles. The same function has been achieved in prior art, but with considerably more complicated and cumbersome structural parts, as seen in the patent issued to Klieves referenced above.

Figure 1:
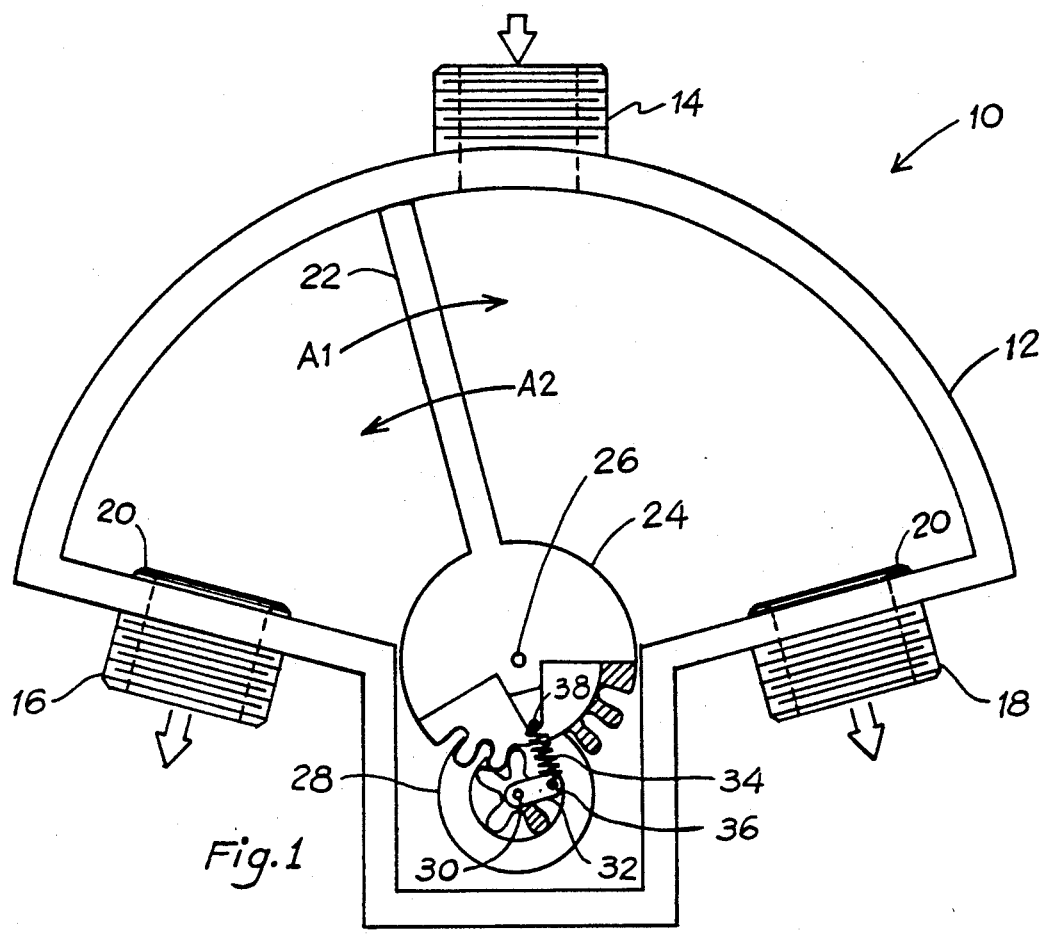
FIG. 1 is a cross-sectional top view of the preferred embodiment of the valve according to this invention wherein the movement of the gate in relation to the inlet and outlet ports is illustrated.

Referring now to the drawings, wherein like parts are designated throughout with like numerals and symbols, FIG. 1 shows a cross-sectional top view of the preferred embodiment of the valve 10 according to this invention, illustrated in perspective in FIG. 8. It consists of a sealed housing 12, constituting the body of the valve, having one inlet port 14 and two outlet ports 16 and 18. The outlet ports are equipped with "O" rings 20 to insure good contact and hermetic sealing with a swing gate 22 that is rigidly attached to a gate assembly 24 capable of rotating approximately 120 degrees around an axle supported by the valve housing 12 along its main axis 26. The semicircular portion of the housing must be constructed with sufficient precision to insure that the gate 22 can freely swing fully in both directions, as indicated by arrows A1 and A2 in FIG. 1. At the same time, the tolerance between the inside of the housing wall and the gate must be small enough to avoid fluid bypass.

The interior of the gate assembly 24, not seen in FIG. 1, is composed of two separate layers of gears that mesh with corresponding layers of gears in the interior (also not shown in FIG. 1) of a spring-arm assembly 28, which is also capable of rotating around an axle along its main axis 30. A spring-arm 32, extending from the axle 30 and positioned in fixed relationship to the gears in the spring-arm assembly, is connected to the gate assembly 24 through a spring 34 attached to two holding pins 36 and 38. The pin 36 is at the end of the spring-arm, while the corresponding pin 38 is located on the gate assembly in a position diametrically opposed to the gate itself. Thus, as the gate 22 and the gate assembly 24 rotate around the axis at 26 and as the gears in the two assemblies interact and mesh, the relative positions of pins 36 and 38 vary, causing the spring 34 to stretch and compress accordingly.

Figure 2:
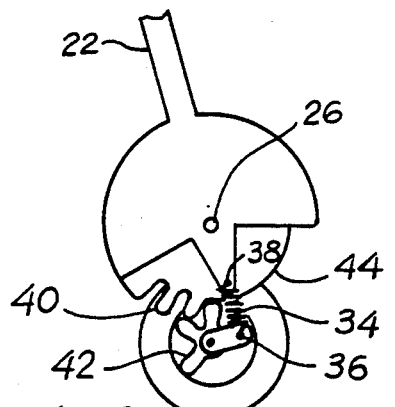
FIG. 2 shows a top view of a first level of meshing gears between the gate and spring arm assemblies.
Figure 3:
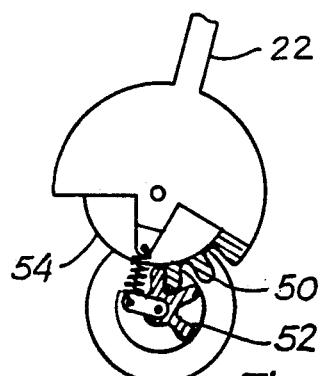
FIG. 3 shows a top view of a second level of meshing gears between the gate and spring arm assemblies.

FIGS. 2 and 3 show a top view of the first and second layer, respectively, of the meshing gears between the gate and spring-arm assemblies. The first layer, shown in FIG. 2, illustrates gate assembly gears 40 which are designed to engage and mesh with spring-arm gears 42. As shown in the drawing, the gears 40 are located between approximately 130 and 160 degrees in a counter-clockwise direction from the axis of the gate 22. Corresponding spring-arm gears 42 are positioned between approximately 60 and 220 degrees in a counterclockwise direction from the axis of the spring arm 32. The number of gears in each assembly, illustrated as three in this embodiment of the invention, can be different so long as the angular relationship between each set of gears is maintained. Finally, the perimeter area 44 opposite to the gate features no gears to a point at least 230 degrees counterclockwise from the axis of the spring arm in order to permit the corresponding disengagement and free relative movement of both assemblies.

Similarly, the second layer of gears, shown in FIG. 3, illustrates gate assembly gears 50 which are designed to engage and mesh with spring-arm gears 52. This layer of gears is shown as shaded in the drawings for ease of identification. As above, the gears 50 are positioned between about 130 and 160 degrees from the gate 22, but in a clockwise direction. Corresponding spring-arm gears 52 are positioned between about 60 and 220 degrees in a clockwise direction from the spring arm 32. Also as above, the number of gears in each assembly, illustrated as three in this embodiment of the invention, can be different so long as the angular relationship between each set of gears is maintained. The perimeter area 54 opposite to the gate also features no gears up to about 220 degrees clockwise from the gate to permit the corresponding disengagement and free relative movement of both assemblies. In essence, the gear arrangements in the second layer of both the gate and the spring-arm assemblies are the flip side of the ones in the first layer.

Figure 4:
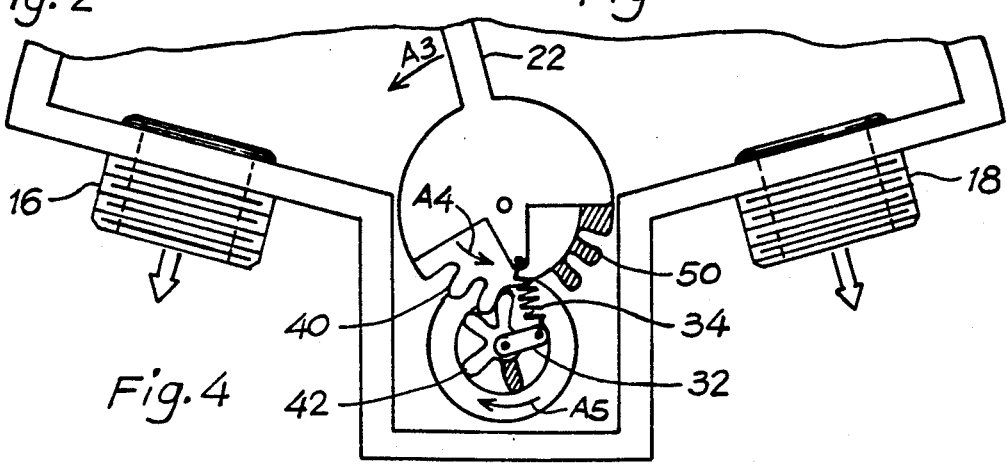
FIG. 4 shows a top view of the meshing gears of FIGS. 2 and 3 automatically switching the position of the gate when the fluid pressure in the system is alternatingly released and reestablished, and it illustrates the relative motion of the gate and spring-arm assemblies within a schematic drawing of the valve when pressure is increased and the gate is swung to seal outlet port B.

Looking now at the functioning of the preferred embodiment of this invention, FIG. 4 shows the gears of FIGS. 2 and 3 within a schematic drawing of the functionally relevant parts of the valve. The position of the gate 22 in FIG. 4 is the same as illustrated in FIG. 1, corresponding to a time when the valve is not subjected to fluid pressure. This position is chosen here as the starting point to show the movement of the parts in the cycle of fluid pressure and the correspondingly alternating discharge of fluid flow. As arrows A3 and A4 illustrate, when the system is pressurized the gate 22 is caused to rotate as far as possible counterclockwise and press against the "O" ring of outlet port 16 to hermetically seal it. As the gate and the gate assembly rotate clockwise, the first layer gears 40 engage gears 42 and cause the spring-arm assembly to rotate in the opposite direction (see arrow A5). As a result of this rotation, the spring arm 32 is repositioned clockwise by approximately 200 degrees to a point beyond which the spring arm cannot rotate, first moved by the action of gears 40 meshing with gears 42 and then pulled by the tension of the spring 34. A stopper, not shown in the drawings, provides the support required to stop the rotation of the spring arm beyond approximately 200 degrees, a distance sufficient for the gears 42 to clear the motion of gears 40.

Figure 5:
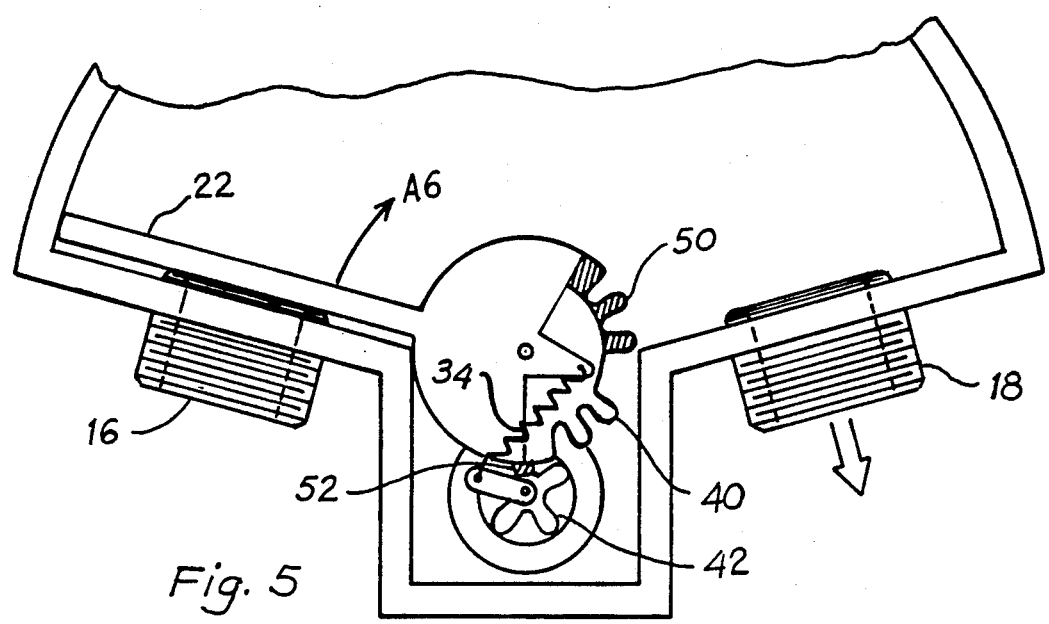
FIG. 5 illustrates the relative motion of the gate and spring-arm assemblies of FIG. 4 within a schematic drawing of the valve when pressure is released and the gate swings to open outlet port B.
Figure 6:
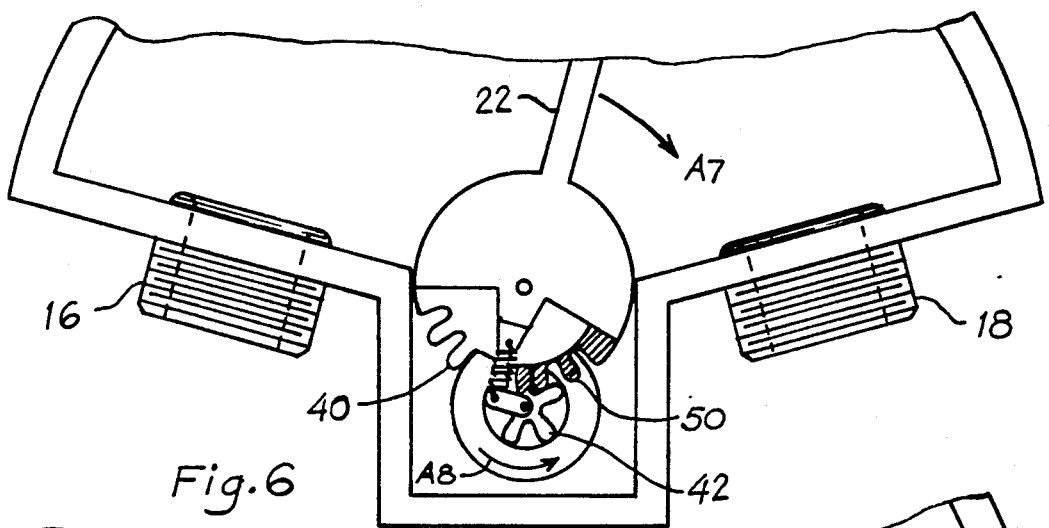
FIG. 6 illustrates the relative motion of the gate and spring-arm assemblies of FIG. 4 within a schematic drawing of the valve when pressure is again increased and the gate swings to seal outlet port C.

This new position of the gate and spring-arm assemblies is shown in FIG. 5, wherein the outlet port 16 is sealed and the fluid flows from the input port to the output port 18. Notice that the spring 34 is now extended and under tension, ready to pull the gate 22 away from the output port 16 as soon as the counteracting fluid pressure is released. Notice also that the shape and relative location of the gears on both layers are designed to permit the free partial rotation of the gate assembly to the position shown in FIG. 6 (approximately 90 degrees), without the engagement of any gears. Thus, when the pressure in the system becomes sufficiently low to be counteracted by the spring 34, the gate assembly swings in the direction of arrow A6 past the inlet port until the spring reaches the point of minimum tension represented by the relative positions shown in FIG. 6.

Figure 7:
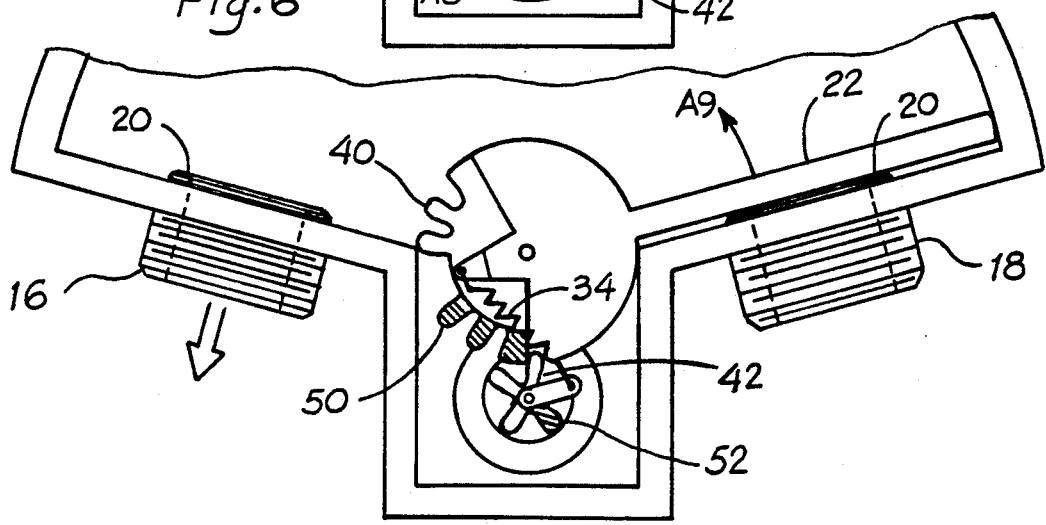
FIG. 7 illustrates the relative motion of the gate and spring-arm assemblies of FIG. 4 within a schematic drawing of the valve when pressure is again released and the gate swings to open outlet port C and restart the alternating cycle.

At this point the second layer gears (shaded in the drawings) are ready to engage and the further clockwise rotation of the gate assembly causes the spring-arm assembly to rotate as well, but in the opposite direction. Thus, when the fluid pressure is reestablished, the gate 22 is pushed clockwise (see arrow A7) to seal the outlet port 18 (leaving the outlet port 16 open to flow) and the spring-arm assembly is rotated counterclockwise (see arrow A8) by approximately 200 degrees to reach the position illustrated in FIG. 7. Again, the spring arm is repositioned to a point beyond which the spring arm cannot rotate, first moved by the action of the gears 50 meshing with gears 52 and then pulled by the tension of the spring 34. Here as well a stopper, not shown in the drawings, provides the support required to stop the rotation of the spring arm beyond approximately 200 degrees, a distance sufficient for the gears 52 to clear the motion of gears 50.

At this point the system is again pressurized, with the fluid flowing to the alternate downstream destination through the outlet port 16, and the spring 34 is again extended and tending to reposition the gate to a new position of minimum tension, as shown in FIG. 4. Thus, when the pressure of the fluid is sufficiently decreased, the gate 22 is pulled counterclockwise past the input port, as illustrated by arrow A9, to the original position shown in FIG. 4, whereby the fluid connection is switched back to output port 18, and the valve is ready for a new cycle.

With the exception of the spring 34, the valve illustrated in the drawings can be manufactured using mostly plastic components, which are particularly useful for their high wear and low friction characteristics. On the other hand, those skilled in the art can adapt the valve just described to the requirements of any particular application by choosing the appropriate materials, fittings, and dimensions.

Thus, various changes in the details, steps and materials that have been described may be made by those skilled in the art within the principles and scope of the invention herein illustrated and defined in the appended claims. While the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

I claim:

1. An automatic valve for alternately switching between two outlets the direction of fluid flow from a single inlet, comprising:
    (a) an enclosed housing containing one central input port, one first and one second output ports located laterally on each side of said input port, and a rotatable gate, wherein said gate is pressed against either one of said output ports by the fluid pressure in the system to hermetically seal it, whereby a fluid connection exists between said inlet port and said other outlet port;
    (b) first means for cyclically causing said gate to swing away from said sealed output port to a point past said inlet port when the fluid pressure is released, whereby creating a new fluid path connecting said input port and said previously sealed output port; and
    (c) second means for causing said first means to be repositioned when the fluid pressure is reestablished with the result that said gate is pushed by the pressure to complete its motion away from said previously sealed output port and to press against said other output port to hermetically seal it, so that said first means is in position to cause said gate to swing in the opposite direction away from said other newly sealed output port to a point past said inlet port when the fluid pressure is again released, whereby creating the same fluid connection existing prior to the beginning of the pressure cycle.

2. The valve defined in claim 1, wherein said first means for cyclically causing said gate to swing away from said sealed output port when the fluid pressure is released comprises a spring, and wherein said second means for causing said first means to be repositioned comprises a set of meshing gears activated by the motion of said gate resulting from the fluid pressure causing the completion of the cyclical rotation of the gate.

3. An automatic valve for alternately switching between two outlets the direction of fluid flow from a single inlet, comprising:

(a) an enclosed housing with a partial annular cross-section, containing one input port located centrally along the outer arc of said cross-section, one first and one second output ports located laterally on each side of said input port along the radial segments of said cross-section, and a rotatable gate, wherein said gate is capable of rotating from the center of said annular cross-section under pressure from the fluid in the valve and press against either one of said output ports to hermetically seal it, whereby a fluid connection is established between said inlet port and said other outlet port;

(b) a gate assembly rigidly attached to said gate for supporting its rotation within said housing;

(c) a spring-arm assembly equipped with a rigidly attached spring arm connected to said gate assembly by a spring capable of stretching and compressing according to the relative positions of the two assemblies for cyclically causing said gate to swing away from said sealed output port to a point past said inlet port when the fluid pressure is released, whereby creating a new fluid path connecting said input port and said previously sealed output port; and (d) means for rotatably coupling said gate assembly and said spring-arm assembly, whereby, when the fluid pressure is reestablished with the result that said gate is pushed by the pressure to complete its motion away from said previously sealed output port and to press against said other output port to hermetically seal it, said spring-arm assembly is repositioned so that said spring is in position to cause said gate to swing in the opposite direction away from said other newly sealed output port to a point past said inlet port when the fluid pressure is again released, thus creating the same fluid connection existing prior to the beginning of the pressure cycle.

4. The valve defined in claim 3, wherein said means for rotatably coupling said gate assembly and said spring-arm assembly comprises a set of meshing gears activated by the motion of said gate resulting from the fluid pressure causing the completion of the cyclical rotation of the gate.

5. The valve defined in claim 4, wherein said set of meshing gears comprises two symmetrical layers of meshing gears operating independently and alternately in coupling the motion of said spring-arm assembly to the motion of said gate assembly in opposite directions.

6. The valve defined in claim 5, wherein each of said symmetrical layer of meshing gears comprises gate assembly gears located between approximately 130 and 160 degrees in a counterclockwise direction from the axis of said gate, and comprises correspondingly meshing spring-arm assembly gears positioned between approximately 60 and 220 degrees in a counterclockwise direction from the axis of said spring arm.

7. The valve defined in claim 6, wherein the number of said gate assembly gears in each of said symmetrical layers is three and the number of said correspondingly meshing spring-arm assembly gears in each of said symmetrical layers is three.

8. A method for automatically and alternately switching the direction of fluid flow between two outlets from a single inlet, comprising the following steps:

(a) providing an enclosed housing containing one central input port, one first and one second output ports located laterally on each side of said input port, and a rotatable gate, wherein said gate is pressed against either one of said output ports by the fluid pressure in the system to hermetically seal it, whereby a fluid connection exists between said inlet port and said other outlet port;

(b) providing a first means for cyclically causing said gate to swing away from said sealed output port to a point past said inlet port when the fluid pressure is released, whereby creating a new fluid path connecting said input port and said previously sealed output port;

(c) providing a second means for causing said first means to be repositioned when the fluid pressure is reestablished with the result that said gate is pushed by the pressure to complete its motion away from said previously sealed output port and to press against said other output port to hermetically seal it, so that said first means is in position to cause said gate to swing in the opposite direction away from said other newly sealed output port to a point past said inlet port when the fluid pressure is again released, whereby creating the same fluid connection existing prior to the beginning of the pressure cycle; and (d) periodically interrupting the flow of fluid to said input port, so as to cause a pressure drop sufficient to allow the functioning of said first means, and subsequently reestablishing the flow of fluid to said input port, so as to cause a pressure increase sufficient to effect the functioning of said second means.

9. The method defined in claim 8, wherein said first means for cyclically causing said gate to swing away from said sealed output port when the fluid pressure is released comprises a spring, and wherein said second means for causing said first means to be repositioned comprises a set of meshing gears activated by the motion of said gate resulting from the fluid pressure causing the completion of the cyclical rotation of the gate.

10. A method for automatically and alternately switching the direction of fluid flow between two outlets from a single inlet, comprising the following steps:

(a) providing an enclosed housing with a partial annular cross-section, containing one input port located centrally along the outer arc of said cross-section, one first and one second output ports located laterally on each side of said input port along the radial segments of said cross-section, and a rotatable gate, wherein said gate is capable of rotating from the center of said annular cross-section under pressure from the fluid in the valve and press against either one of said output ports to hermetically seal it, whereby a fluid connection is established between said inlet port and said other outlet port;

(b) providing a gate assembly rigidly attached to said gate for supporting its rotation within said housing;

(c) providing a spring-arm assembly equipped with a rigidly attached spring arm connected to said gate assembly by a spring capable of stretching and compressing according to the relative positions of the two assemblies for cyclically causing said gate to swing away from said sealed output port to a point past said inlet port when the fluid pressure is released, whereby creating a new fluid path connecting said input port and said previously sealed output port;

(d) providing means for rotatably coupling said gate assembly and said spring-arm assembly, whereby, when the fluid pressure is reestablished with the result that said gate is pushed by the pressure to complete its motion away from said previously sealed output port and to press against said other output port to hermetically seal it, said spring-arm assembly is repositioned so that said spring is in position to cause said gate to swing in the opposite direction away from said other newly sealed output port to a point past said inlet port when the fluid pressure is again released, thus creating the same fluid connection existing prior to the beginning of the pressure cycle; and (e) periodically interrupting the flow of fluid to said input port, so as to cause a pressure drop sufficient to allow the functioning of said spring, and subsequently reestablishing the flow of fluid to said input port, so as to cause a pressure increase sufficient to effect the functioning of said means for rotatably coupling said gate assembly and said spring-arm assembly.

11. The method defined in claim 10, wherein said means for rotatably coupling said gate assembly and said spring-arm assembly comprises a set of meshing gears activated by the motion of said gate resulting from the fluid pressure causing the completion of the cyclical rotation of the gate.

12. The method defined in claim 10, wherein said set of meshing gears comprises two symmetrical layers of meshing gears operating independently and alternately in coupling the motion of said spring-arm assembly to the motion of said gate assembly in opposite directions.

13. The method defined in claim 12, wherein each of said symmetrical layer of meshing gears comprises gate assembly gears located between approximately 130 and 160 degrees in a counterclockwise direction from the axis of said gate, and comprises correspondingly meshing spring-arm assembly gears positioned between approximately 60 and 220 degrees in a counterclockwise direction from the axis of said spring arm.

14. The method defined in claim 13, wherein the number of said gate assembly gears in each of said symmetrical layers is three and the number of said correspondingly meshing spring-arm assembly gears in each of said symmetrical layers is three.

* * * * *